United States Patent [19]
Wieder et al.

[11] Patent Number: 5,190,425
[45] Date of Patent: Mar. 2, 1993

[54] ANCHOR

[75] Inventors: Alicia Wieder, Willowbrook; Ralph D. Tenuta, Mt. Prospect, both of Ill.

[73] Assignee: Illinois Tool Works Inc., Glenview, Ill.

[21] Appl. No.: 780,011

[22] Filed: Oct. 21, 1991

[51] Int. Cl.$^5$ .................................. F16B 25/00
[52] U.S. Cl. ..................... 411/387; 411/29; 411/55
[58] Field of Search ............ 411/387, 30, 55, 178, 411/29, 31, 386, 395, 59, 71

[56] References Cited

U.S. PATENT DOCUMENTS

| | | | |
|---|---|---|---|
| 3,316,796 | 5/1967 | Young | 411/29 |
| 4,028,987 | 6/1977 | Wilson | 411/387 |
| 4,601,625 | 7/1986 | Ernst et al. | 411/387 |
| 4,900,208 | 2/1990 | Kaiser et al. | 411/387 |
| 5,039,262 | 8/1991 | Giannuzzi | 411/55 X |

FOREIGN PATENT DOCUMENTS

| | | | |
|---|---|---|---|
| 2642801 | 8/1990 | France | 411/178 |
| 8805991 | 8/1988 | World Int. Prop. O. | 411/29 |

*Primary Examiner*—Rodney M. Lindsey
*Attorney, Agent, or Firm*—Schwartz & Weinrieb

[57] ABSTRACT

A self-drilling anchor for insertion into a workpiece such as a drywall to secure an element to the workpiece comprises a drilling portion having substantially parallelo-gram configured blade means for drilling a bore of pre-determined diameter into the workpiece, and a threaded portion including a generally cylindrical body of a diameter substantially the same as the diameter of the bore. The body has thread means for tapping into the bore to secure the anchor in the workpiece. The body also has a section having portions comprising a tapered portion of the threaded body portion and rearwardly inclined portions of the blade means of substantially less diameter or lateral extent than the diameter of the bore joining the drilling and threaded portions. The section receives particulate dislodged from the workpiece by the drilling of the bore, thereby preventing accumulation of particulate impeding insertion of the anchor.

20 Claims, 1 Drawing Sheet

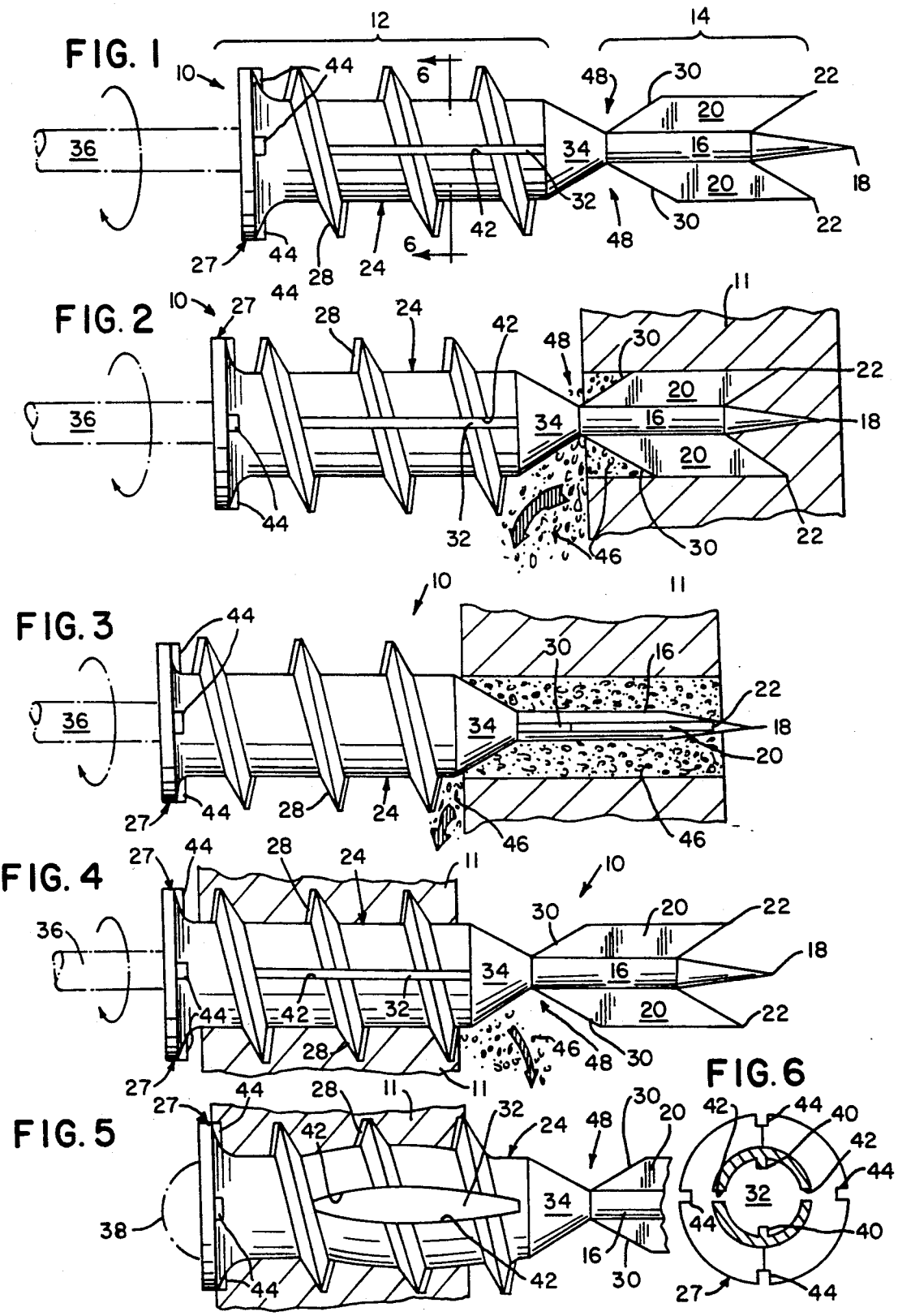

ANCHOR

FIELD OF THE INVENTION

The present invention relates generally to a new and improved construction for an anchor and more specifically to a self-drilling anchor for use in drywall structures.

BACKGROUND OF THE INVENTION

The construction and functionality of anchors is well known in the relevant art. Basically, anchors are intended to be embedded into a piece of material, and to hold and to firmly retain a fastener therein once it has been embedded or otherwise inserted into the piece. Anchors are particularly desirable for use with materials which themselves lack the structural integrity sufficient to firmly hold and retain fasteners directly. Gypsum board, commonly known as drywall, is one example of such a material. With the use of anchors, objects which otherwise could not be mounted on drywall solely by fasteners can be mounted on the drywall. An example of a self-drilling dry wall anchor is disclosed in the U.S. Pat. No. 4,601,625 to Ernst et al.

To insure that the anchors will remain firmly within the drywall, or other material, the anchors are often self-drilling. The anchors have a drilling section disposed on its entering end which is capable of removing portions of the drywall upon application of an axial torque to the head of the anchor. In this way, it is assured that the bore formed through the drywall will not be too big. By self-drilling its own bore, the anchor assures that the bore will be of proper size, and will firmly retain the anchor therein, thereby preventing anchor pull out.

Self-drilling does, however, present difficulties on occasion. As the anchor drills its own bore through the drywall, particulate is formed from the drilled portions of the drywall. This particulate can fill the bore as it is formed and become compressed by further drilling of the anchor, thereby complicating the self-drilling process. Additionally, once the anchor has reached the opposite edge of the drywall, no means are provided for facilitating removal of the particulate from the bore.

The presence of the particulate in the bore can make the self-drilling process more difficult, prohibiting good tapping of the anchor into the drywall. The particulate can resist the torque on the anchor. Also, the particulate may rotate along with the anchor, possibly enlarging the size of the bore. If the bore is enlarged, the anchor can pull out of the bore upon the application of an appropriate force, such as that usually attendant with the mounting of objects, such as picture frames and the like, on the drywall. Additionally, the presence of the particulate can maximize the effects of torque on the anchor, thereby causing it to break as a fastener is inserted therein. The anchor of the present invention is intended to alleviate these, among other, drawbacks of anchor constructions of the prior art.

OBJECTS AND SUMMARY OF THE INVENTION

A general object of the present invention is to provide a unique and useful construction for an anchor.

A more specific object of the invention is to provide an anchor having means for receiving particulate drilled from a piece of material by insertion of the anchor therein.

An additional object of the invention is to provide an anchor having means for receiving particulate constructed so that the particulate can drop away therefrom as the anchor is drilled into the material.

A further object of the present invention is to provide an anchor having expansion means which can expand the anchor in order to receive fasteners of different sizes.

An additional object of the present invention is to provide a threaded anchor having means for promoting cutting or tapping of complementary threads in a workpiece.

Another object of the present invention is to provide an anchor which resists turning after being fully installed.

A self-drilling anchor for insertion into a workpiece such as a drywall to secure an element to the workpiece comprises a drilling portion having substantially parallelogram configured blade means having forwardly extending pointed portions for drilling a bore of predetermined diameter into a workpiece, and a threaded portion including a generally cylindrical body of a diameter substantially the same as the diameter of the bore. The body has thread means for tapping into the bore to secure the anchor in the workpiece. The body also has a section, having portions comprising a tapered portion of the threaded body portion and rearwardly inclined portions of the blade means of substantially less diameter or lateral extent than the diameter of the bore, joining the drilling and threaded portions. The section receives particulate dislodged from the workpiece by the drilling of the bore, thereby preventing accumulation of particulate impeding insertion of the anchor.

BRIEF DESCRIPTION OF THE DRAWINGS

The organization and manner of the structure and operation of the invention, together with further objects and advantages thereof, may best be understood by reference to the following description taken in connection with the accompanying drawings, wherein like reference numerals identify like elements and wherein:

FIG. 1 is a side elevational view of an anchor, constructed according to the teachings of the present invention, showing the unique construction thereof;

FIG. 2 is a side elevational view of the anchor of FIG. 1 drilling through a piece of drywall, or similar material, illustrating the functionality of the relieved section;

FIG. 3 is a view similar to that of FIG. 2 showing the anchor drill being disposed entirely within the drywall;

FIG. 4 is a view similar to that of FIG. 3 with the anchor threaded within the drywall, and illustrating the further functionality of the relieved section;

FIG. 5 is a side elevational view of the anchor of FIG. 1 having a fastener therein showing the expansion of the anchor by the expansion means to accept the fastener; and FIG. 6 is a sectional view, taken along line 6—6 of FIG. 1, with the anchor threads not shown for clarity.

DETAILED DESCRIPTION OF THE PREFERRED EMBODIMENT

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein.

Referring initially to FIG. 1, a threaded insert or anchor 10, constructed according to the teachings of the present invention, is shown. The anchor 10 will be specifically disclosed with respect to its employment with a workpiece 11 constructed of drywall. However, it is to be noted and understood that the anchor 10 can be utilized with workpieces 11 constructed of other materials without departing from the teachings of the invention. The anchor 10 can be composed of a plurality of materials, such as plastic, or a zinc material, depending upon the requirements of the specific employment of the anchor 10.

The anchor 10 is preferably formed of a molded plastic and generally comprises a threaded portion 12 and a drilling portion 14. The drilling portion 14 is constructed for drilling an appropriately sized hole or bore in the workpiece 11 to facilitate threaded insertion of the anchor 10 therein.

The drilling portion 14 includes a central longitudinal stem or rib 16 terminating at its forwards end in a conical drilling tip 18. A pair of substantially parallelogram configured drill blades 20 extend diametrically oppositely from the stem 16 terminating at their forward ends in drill points 22 disposed somewhat rearwardly from the drill tip 18.

Thus, the conical tip 18 is located centrally on the drilling portion 14 with the points 22 of the blades 20 flanking the conical tip 18 along a diameter thereof. With this point configuration, as the anchor 10 engages a surface of the workpiece 11, the conical tip 18 forms essentially a pilot hole for centering the bore to be drilled in the workpiece 11, while the points 22 perform most of the actual drilling of the bore, as will be discussed further herein.

The threaded portion 12 of the anchor 10 includes a generally cylindrical body 24 having an annular end flange 27. The body 24 extends forwardly into connection with the drilling portion 14 by structure to be subsequently described.

A thread 28 is disposed on the body 24 from adjacent the end flange 27 forwardly along the length of the body 24. The thread 28 is of substantially uniform diameter along its length until it tapers and merges into the surface of the body 24 adjacent the end opposite the end flange 27. As will be subsequently described, the body 24 includes an internal bore 32 designed to receive a tool to drill the anchor 10 into the workpiece 11.

The threaded portion 12 and the drilling portion 14 of the anchor 10 are integrally connected by a frusto-conical section 34 having a diameter at one end the same as that of the body 24. The diameter uniformly decreases as the frusto-conical section 34 extends forwardly into connection with the central stem 16 of the drilling portion 14. It will be seen that each blade 20 has an end 30 sloping downwardly at an angle to join the frusto-conical section 34 adjacent to the connection between the section 34 and the stem 16.

The above-described structure joining the threaded and drilling portions 12 and 14, respectively, defines an area of relief 48 in a diametric and longitudinal sense for receiving particulate dislodged in the drilling operation to be subsequently described.

The anchor 10 of the invention includes a bore 32 constructed specifically to receive a No. 2 Phillips head screw driver 36 to drive the anchor 10 into the workpiece 11, and also to subsequently threadedly receive a fastener 38 to secure an element to the workpiece 11.

As shown in FIG. 6, the bore 32 includes a pair of splines 40 extending longitudinally along the bore 32 in diametrically opposed relation. The splines 40 serve conventionally for tapping the threaded fastener 38 into the anchor 10.

The anchor 10 is constructed to accept No. 6 and No. 8 fasteners. To accommodate these fasteners of different diameters, a pair of elongated slots 42 may be defined in the body 24 of the anchor 10 along a substantial portion of its length. As shown in FIG. 6, the slots 42 extend laterally completely through the body wall. The slots 42 provide for expansion of the anchor 10, as shown in exaggerated form in FIG. 5, when the larger diameter fastener is used.

As best shown in FIG. 6, the anchor 10 may be provided with a plurality of small ribs 44 at spaced intervals on the underside or thread side of the end flange 27. These ribs 44 bite into the surface of the workpiece 11 when the anchor 10 is fully seated to assist in preventing backout rotation of the anchor 10.

Overall, it will be seen that in the anchor 10 of the invention, the threaded portion 12 is substantially the same length as the drilling portion 14. The cutting blades 20 extend radially outwardly from the stem 16 a total distance substantially the same as the diameter of the cylindrical body 24.

In operation, the anchor 10 is held at substantially a right angle to the workpiece 11 and the anchor 10 is pushed so that the point drill tip 18 penetrates into the workpiece 11. A No. 2 Phillips head screw driver 36 is inserted into the internal bore 32 and the self-drilling operation is started. The drill tip 18 centers the anchor 10 along the intended path of drilling. The drill or cutting points 22 cut a cylindrical bore into the workpiece or drywall 11 as the anchor 10 is rotated. This creates particulate 46 as the points 22 cut away the material of the drywall 11.

It can now be appreciated with reference to FIG. 2 that the increasing amount of particulate 46 can move toward the entrance of the bore being drilled. Due to the unique combination of the frusto-conical section 34 and the sloped blade ends 30, an area of relief 48 is created into which the particulate 46 can move and be directed out of the bore. Accordingly, the self-drilling process in not inhibited by accumulation of particulate 46.

As shown in FIG. 3, the entrance to the bore will eventually be closed off as the section 34 moves into the bore. Even if the wall thickness is such that the drilling portion 14 has not yet pushed through the wall 11, the relief area 48 defined by the section 34 serves as a reservoir for the particulate 46.

As shown in FIG. 4, the thread 28 taps its way into the drywall 11 to ultimately securely seat the anchor 10 in the wall 11. Particulate 46 is carried along by the section 34 and dumped from the backside of the wall 11 as shown. Accordingly, it will be appreciated that the particulate 46 is ejected on the front or entrance side of the wall 11 during drilling (FIG. 2) and ejected at the back or exit side of the wall 11 during threading (FIG. 4).

The anchor 10 is driven until the end flange 27 engages the front side of the wall 11, with the ribs 44 sunk into the wall 11 as shown in FIG. 5. The element (not shown for clarity) to be attached to the wall 11 can then be secured in place by driving the fastener 38 through the element and into the bore 32 of the anchor 10. The threads of the fastener tap into the splines 40 to securely retain the fastener 38 with the anchor 10.

It is also to be noted that the length of the anchor 10 from the drilling portion 14 to the end of the reduced section 34 opposite the drill 20 is substantially equal to the width or thickness of a portion of the workpiece 11 into which the anchor 10 is to be drilled. This construction facilitates particulate 46 removal.

While a preferred embodiment of the present invention is shown and described, it is envisioned that those skilled in the art may devise various modifications of the present invention without departing from the spirit and scope of the appended claims. The invention is not intended to be limited by the foregoing disclosure, but only by the following appended claims.

The invention claimed is:

1. A self-drilling anchor for insertion into a workpiece so as to secure an element to said workpiece, comprising:
   a drilling portion comprising a pair of oppositely disposed blade means having a substantially parallelogram configuration including forwardly extending inclined drill point means for drilling a bore of a predetermined diameter within a workpiece;
   a threaded portion including a generally cylindrical body having a diameter which is substantially the same as said diameter of said bore, and thread means formed upon said body for tapping said bore so as to secure said anchor within said workpiece; and
   a section, having portions of substantially less diameter than said diameter of said bore and joining said drilling and threaded portions together, and comprising a tapered portion formed upon a forward portion of said cylindrical body and rearwardly extending inclined portions of said parallelogram configured blade means, for receiving particulate matter dislodged from said workpiece as a result of said drilling of said bore and for discharging said particulate matter from said bore, thereby preventing accumulation of said particulate matter within said bore so as not to impede insertion of said anchor within said workpiece.

2. An anchor as defined in claim 1 wherein said tapered portion of said section includes a frusto-conical portion toward which said particulate moves during drilling and away from which said particulate moves after the drilling portion has drilled through the workpiece.

3. An anchor as defined in claim 2 wherein said inclined portions of said blade means include end portions sloping laterally inwardly toward the frusto-conical portion.

4. An anchor as defined in claim 2 wherein the frusto-conical portion has a diameter at one end substantially the same as the diameter of the body, and the diameter of the frusto-conical portion uniformly decreases as the frusto-conical portion extends forwardly into connection with the drilling portion.

5. An anchor as defined in claim 2 wherein the blade means includes a stem projecting from the frusto-conical portion and drilling point means extend radially outwardly from the stem a total distance substantially the same as the diameter of the body.

6. An anchor as set forth in claim 5, further comprising:
   a drill tip disposed upon the forward end of said stem of said blade means for forming a pilot hole for defining the center of said bore to be drilled within said workpiece.

7. An anchor as set forth in claim 6, wherein:
   said drill tip extends forwardly beyond said forwardly extending inclined drill point means of said blade means.

8. An anchor as defined in claim 1 wherein the drilling portion declines to a juncture of the section as defined by said rearwardly extending inclined portions of said blade means, and the section slopes upwardly from the juncture with the drilling portion to a juncture with the threaded portion.

9. An anchor as defined in claim 1 further comprising a drill tip disposed on the drilling portion for forming essentially a pilot hole for defining the center of the bore to be drilled in the workpiece.

10. An anchor as defined in claim 1 further comprising an end flange located on an end of the threaded portion opposite to the drilling portion, and rib means depending from the end flange for biting into the workpiece when the anchor is fully seated in the bore to assist in preventing backout rotation thereof.

11. An anchor as set forth in claim 10, wherein:
    said rib means comprises four ribs equiangularly disposed about an outer peripheral portion of said end flange.

12. An anchor as defined in claim 1 wherein the length of the anchor from the drilling portion to the end of the threaded portion disposed opposite the drilling portion is substantially equal to a width or thickness of a portion of the workpiece into which the anchor is to be drilled.

13. An anchor as defined in claim 1 wherein the body of the threaded portion includes a central bore for receiving a driving tool for inserting the anchor, and the body further including elongated slots defined therethrough for permitting expansion of the anchor body to receive fasteners therein at different diameters.

14. A threaded insert for insertion into a workpiece so as to secure an element to said workpiece, comprising:
    an elongated body having a head end and an entering end;
    a drilling portion disposed upon said elongated body adjacent to said entering end and comprising a pair of oppositely disposed blade means having a substantially parallelogram configuration including forwardly extending inclined drill point means for drilling a bore of a predetermined diameter for said insert within a workpiece;
    a threaded portion disposed upon said elongated body adjacent to said head end and including a substantially cylindrical body having a diameter which is substantially equal to said predetermined diameter of said bore, and thread means formed upon said cylindrical body for tapping said bore so as to secure said threaded insert within said workpiece;
    a substantially reduced section joining said drilling portion to said threaded portion and comprising a tapered portion formed upon a forward portion of said cylindrical body of said threaded portion and rearwardly extending inclined portions of said parallelogram configured blade means, for receiving particulate matter dislodged from said workpiece as a result of the drilling process by said drilling portion and for discharging said particulate matter from said bore, thereby preventing accumulation of said particulate matter within said bore so as not to impede insertion of said threaded insert within said workpiece; and a central bore defined within said cylindrical body of said threaded portion for receiving a fastener.

15. A threaded insert as defined in claim 14 wherein the threaded portion is substantially the same length as the drilling portion.

16. An insert as set forth in claim 14, wherein:
said tapered portion of said reduced section comprises a frusto-conical portion toward which said particulate matter moves during said drilling process and away from which said particulate matter moves after said drilling portion has drilled through said workpiece.

17. An insert as set forth in claim 14, wherein:
said drilling portion further comprises an axial stem portion having a drill tip formed upon the forwardmost end thereof for forming a pilot hole for defining the center of said bore to be drilled within said workpiece.

18. An insert as set forth in claim 17, wherein:
said drill tip extends forwardly beyond said forwardly extending inclined drill point means of said blade means.

19. An insert as set forth in claim 14, further comprising:
an end flange formed upon an end of said threaded portion disposed opposite to said drilling portion; and rib means formed upon said end flange for bitingly engaging said workpiece when said threaded insert is fully inserted within said bore of said workpiece so as to prevent retrograde rotation of said insert.

20. An insert as set forth in claim 19, wherein:
said rib means comprises four ribs equiangularly disposed about an outer peripheral portion of said end flange.

* * * * *